US008493170B2

(12) United States Patent
Zäuner et al.

(10) Patent No.: US 8,493,170 B2
(45) Date of Patent: Jul. 23, 2013

(54) OVERVOLTAGE PROTECTION DEVICE HAVING ONE OR MORE PARALLEL-CONNECTED OVERVOLTAGE-LIMITING ELEMENTS LOCATED IN ONE PHYSICAL UNIT

(75) Inventors: Edmund Zäuner, Berching/Pollanten (DE); Richard Daum, Neumarkt (DE); Helmut Hirschmann, Berg (DE)

(73) Assignee: DEHN + SÖHNE GmbH + Co. KG, Neumarkt (DE)

( * ) Notice: Subject to any disclaimer, the term of this patent is extended or adjusted under 35 U.S.C. 154(b) by 224 days.

(21) Appl. No.: 12/737,467

(22) PCT Filed: Jul. 6, 2009

(86) PCT No.: PCT/EP2009/058486

§ 371 (c)(1),
(2), (4) Date: Apr. 20, 2011

(87) PCT Pub. No.: WO2010/012565

PCT Pub. Date: Feb. 4, 2010

(65) Prior Publication Data

US 2011/0193674 A1 Aug. 11, 2011

(30) Foreign Application Priority Data

Aug. 1, 2008 (DE) ......................... 10 2008 036 140
Sep. 24, 2008 (DE) ......................... 10 2008 048 644

(51) Int. Cl.

*H01H 85/00* (2006.01)
*H01H 71/20* (2006.01)
*H01H 73/22* (2006.01)
*H02H 5/04* (2006.01)

(52) U.S. Cl.

USPC ........... 337/142; 337/206; 337/147; 337/290; 337/150; 337/265; 361/103

(58) Field of Classification Search

USPC ... 337/142, 206, 147, 290, 150, 265; 361/103
See application file for complete search history.

(56) References Cited

U.S. PATENT DOCUMENTS

| | | | | |
|---|---|---|---|---|
| 8,031,456 | B2 * | 10/2011 | Wang | 361/118 |
| 2005/0231872 | A1 * | 10/2005 | Schimanski et al. | 361/91.1 |
| 2006/0245125 | A1 * | 11/2006 | Aszmus | 361/56 |

(Continued)

FOREIGN PATENT DOCUMENTS

DE 9017577 3/1991

(Continued)

OTHER PUBLICATIONS

Notification of Transmittal of Translation of the International Preliminary Report on Patentability (Chapter I or Chapter II of the Patent Cooperation Treaty), in English, dated Feb. 17, 2011, International Preliminary Report on Patentability (Chapter I of the Patent Cooperation Treaty), in English, dated Feb. 8, 2011, and International Search Report, in English, dated Sep. 8, 2009.

*Primary Examiner* — Bradley Thomas
(74) *Attorney, Agent, or Firm* — Gerald T. Bodner

(57) ABSTRACT

The invention relates to an overvoltage protection device having one or more parallel-connected voltage-limiting elements which are located in one physical unit, such as varistors, diodes or means of this type configured in the form of a disc, comprising a shell apparatus in order to electrically disconnect the overvoltage-limiting elements when they are thermally overloaded, and means for indication and/or signalling of the fault state which then occurs, wherein the switching apparatus is connected via a means which can be released thermally, such as adhesive or a solder, to a connecting contact of the at least one overvoltage-limiting element, and/or to an external terminal contact or plug contact. According to the invention, the switching apparatus is in the form of a solid U-shaped switching fork, the fork tines of which run essentially parallel to the side surfaces of the overvoltage-limiting element, holding the latter in the space between the tines. At least one of the fork tines rests on the at least one connecting contact and is fixed there via the means which can be released thermally wherein, when disconnection occurs, the disconnection slide is moved with the switching fork being driven and, in the process, the connection point between the fork tines and the connecting contact represents a fulcrum for the switching fork movement.

20 Claims, 4 Drawing Sheets

U.S. PATENT DOCUMENTS

2009/0097183 A1* 4/2009 Cernicka ........................ 361/103
2009/0302992 A1* 12/2009 Cernicka ........................ 337/412

FOREIGN PATENT DOCUMENTS

| | | |
|---|---|---|
| DE | 102004024657 | 2/2006 |
| DE | 102006036598 | 10/2007 |
| EP | 0716493 | 6/1996 |
| EP | 0867896 | 9/1998 |
| EP | 0905839 | 3/1999 |
| WO | WO2006/120522 | 11/2006 |

* cited by examiner

OVERVOLTAGE PROTECTION DEVICE HAVING ONE OR MORE PARALLEL-CONNECTED OVERVOLTAGE-LIMITING ELEMENTS LOCATED IN ONE PHYSICAL UNIT

The invention relates to an overvoltage protection device having one or more parallel-connected overvoltage-limiting elements, which are located in one physical unit, such as varistors, diodes or means of this type configured in the form of a disc, comprising a switching device in order to electrically disconnect the overvoltage-limiting elements when they are thermally overloaded, and means for indicating and/or reporting the fault condition which then occurs, wherein the switching device is connected via a thermally separable means, such as an adhesive or a solder, to a connecting contact of the at least one overvoltage-limiting element and/or to an external clip contact or plug contact, and wherein the at least one connecting contact is located on one of the side faces of the overvoltage-limiting element configured in the form of a disc, according to the preamble of patent claim 1.

An assembly consisting of several disc-shaped varistors as the overvoltage-limiting elements for an overvoltage protection device is already known from EP 0 867 896 A1. According to this solution it is possible to disconnect each of the parallel-connected varistors separately and trigger a corresponding fault indicator. According to this document electrical connections are realized by a stranded conductor, which is stable with respect to surge currents only to a limited extent, however.

Another device for the protection against the occurrence of transient electrical overvoltages comprising at least two varistors and disconnecting means is already known from EP 0 716 493 B1, with each of the varistors being separately disconnectable as well. Also, each disconnecting device is assigned an indicator for reporting the fault condition which then occurs. The disconnection is realized by preloaded bows located on the narrow longitudinal edges of the disc-shaped varistors. The bows are connected to a corresponding counter contact point by a low-melting solder.

DE 10 2006 036 598 A1 describes a method for dimensioning a disconnecting device for a surge arrester. The disconnecting movement is here accomplished by a switching tongue which is oriented in the opposite direction of a holding force, which is produced by a protection solder, by a permanently active spring force. The switching tongue, which has to be flexible, carries the total current, with the result that only low-level surge currents can be carried due to the small cross-sections and the flexibility of the connecting plates.

An overvoltage protection device having parallel-connected varistors of the same size and with the same surge current stability is known from the German utility model 90 17 577 U1. The varistors are arranged electrically parallel with respect to each other. The required electrical connections between the varistors are realized by a bridge in the form of a copper strand as well as by means of a contact rail. It has shown, however, that such copper strands fan out when subjected to surge current loads, which represents a significant disadvantage.

The assembly for arresting overvoltages according to DE 10 2004 024 657 A1, which comprises one or more parallel-connected overvoltage-limiting elements, which are located in one physical unit, such as varistors, diodes or the like also includes a switching device in order to electrically disconnect the overvoltage-limiting element(s) when it is/they are thermally overloaded. To this end, the switching device is arranged inside the physical unit consisting of two varistor discs, which are located next to each other in parallel and spaced apart from each other, between the varistor discs on a partition wall, and contacting discs or contacting plates for connecting the varistors are in thermal contact with the respective switching device. The contacting discs or contacting plates are laid to eliminate the electromagnetic forces in the event of a surge current load. Although such a solution improves the surge current carrying capacity, the thermal coupling of the parallel-connected voltage-limiting elements to the thermally reacting switching device is insufficient.

In the pluggable surge arrester according to EP 0 905 839 A1, too, at least one disc-shaped varistor is employed. A soldering joint is provided in the lead to the surge arrester element, which melts when thermally loaded. Moreover, a spring-preloaded lead part in the form of a bridge is provided, whose two ends are connected to other lead parts by a soldered connection. If the temperature at the respective soldering joints rises to an extent that the melting point of the solder is reached, the bridge is drawn out and the varistor is electrically disconnected. However, in this embodiment the thermal coupling between the aforementioned bridge and the varistor is only insufficient. Also, the surge current stability is insufficient owing to the bridge soldered on either side and the positioning of the actual disconnecting device.

Based on the foregoing it is the object of the invention to provide a further developed overvoltage protection device having one or especially more parallel-connected overvoltage-limiting elements, which are located in one physical unit, such as varistors, diodes or means of this type configured in the form of a disc which is, as a whole, capable of carrying higher surge current values up to a range of 100 kA, which had not been possible before with the solutions according to the prior art. Moreover, the proposed embodiment of an overvoltage protection device comprising a disconnecting device is to consist of as few components as possible so as to provide an automated and, thus, more cost-efficient fabrication. Also, it should be ensured that a safe synchronous disconnection of two or more parallel-connected overvoltage-limiting elements takes place. To this end, it is also necessary to find a construction which provides for a sufficient thermal coupling between the overvoltage-limiting elements and the switching and disconnecting device, respectively.

The solution to the object of the invention is achieved according to the combination of features defined in patent claim 1. The dependent claims comprise at least useful embodiments and further developments.

Accordingly, there is provided an overvoltage protection device having one or more parallel-connected overvoltage-limiting elements, which are located in one physical unit, such as varistors, diodes or means of this type configured in the form of a disc. The overvoltage protection device comprises a switching device in order to electrically disconnect the overvoltage-limiting elements, specifically varistors, when they are thermally overloaded. Further provided are means for indicating and/or reporting the fault condition which occurs in the event of a disconnection. The switching device is connected via a thermally separable means, such as an adhesive, a wax or a solder, to one of the connecting contacts of the at least one overvoltage-limiting element and/or via such a thermally separable means to an external clip contact or plug contact. The at least one connecting contact is located on one of the side faces of the overvoltage-limiting element configured in the form of a disc.

According to the invention the switching device is in the form of a U-shaped switching fork made of a solid material, the fork tines of which run essentially parallel to the side faces of the overvoltage-limiting element and receive the latter in the space between the tines.

The section connecting the fork tines is electrically connected to one of the external clip or plug contacts and rests on a separating slide which comprises at least one claw-type section encompassing the end of the switching fork located there.

The separating slide is subjected to a preload, specifically to a spring force preload, wherein the force vector in this regard is oriented to face away from the point of connection between the switching fork and the external clip or plug contact.

At least one of the fork tines lies against the at least one connecting contact specifically of the varistor, where it is fixed by the aforementioned thermally separable means, wherein, in the event of a disconnection, the separating slide moves by carrying along the switching fork, with the point of connection between the fork tine and the connecting contact representing a fulcrum with respect to the movement of the switching fork.

As no bending motion of the switching device is necessary in comparison with the different solutions according to the prior art the switching device may be made of a particularly solid material, with the result that a high surge current carrying capacity is achieved. Also, the solid realization of the switching fork results in an excellent thermal conductivity, so that a very good thermal contact is provided from the heat source, i.e. the overvoltage-limiting element, to the heat sink, i.e. the corresponding points of connection provided with the thermally separable means.

According to a preferred embodiment the overvoltage-limiting elements are comprised of at least two varistor discs, which are arranged in parallel, which have a first connecting contact on one of their side faces, wherein the additional second connecting contacts are electrically connected to the additional ones of the external clip or plug contacts. In this embodiment, the respective fork tines of the switching fork are each fixed to one of the first connecting contacts by the thermally separable means, wherein occurring currents can now flow through the fork tines in the parallel direction.

The separating slide is mounted in a guide which forms part of the bottom of a housing receiving the protection device.

The separating slide moves parallel to the housing bottom between openings located there for receiving the clip or plug contacts.

The claw-type sections of the separating slide extend from the housing bottom in an upward direction, wherein preferably two claw-type sections are provided on the respective outer end sections of the separating slide so as to reliably grab the switching fork without bending out of line during the disconnection process. The disc-shaped overvoltage-limiting elements extend substantially perpendicular to the housing bottom in an upward direction, wherein an insulating bearing part is provided between the separating slide and the disc-shaped overvoltage-limiting elements.

A fixing leg for receiving a movable optical display panel extends over the longitudinal outer edge of the disc-shaped overvoltage-limiting elements by partially encompassing the latter.

The movable display panel comprises at least one, preferably two lateral prolongations with a groove, wherein one end or both ends of the fork tine of the switching fork engage(s) with the groove so as to change the position of the display panel during the disconnection process.

According to one embodiment an opening for receiving a pin, specifically a pressure pin, is located in the housing bottom, which pin actuates or triggers a remote fault indicating device depending on the position of the separating slide.

The connecting contacts on the side faces of the overvoltage-limiting element, specifically varistor, are configured as strip-shaped stop edges projecting from the side face plane.

The thermally separable means can connect the fork tines to the connecting contacts on the overvoltage-limiting elements as well as the section connecting the fork tines to the external clip or plug contact.

The ends of the stop edges facing in the direction of the housing bottom of the assembly then define the fulcrum for the movement of the switching fork during the disconnection process.

The switching fork may be fabricated as a solid stamped part, which results in the aforementioned large contact surfaces and in the desired high mechanical stability in terms of a maximum surge current carrying capacity.

The action of forces of the fork tines flown through by the current in parallel supports the stability of the provided soldering joints which is, again, advantageous for the surge current stability. Moreover, the size of the soldering surface can be minimized by this occurring effect.

The fabrication of the U-shaped switching fork from a solid material which, as intended, does not bend and the movement of the disconnecting device by the separating slide allow a safe, synchronous disconnection of several parallel-connected varistors. In addition, an excellent thermal coupling of the varistors is provided by the joint direct soldering and the external connection by the common solid disconnecting bow, i.e. the switching fork.

The overall width of the overvoltage protection device is only insignificantly increased by the switching fork so that, with respect to the dimensions, standardized housings may be used for the complete overvoltage protection device.

The invention shall be explained in more detail below by means of an embodiment with the aid of the figures:

The overvoltage protection device according to the embodiment is based on two parallel-connected varistors which are connected to form a varistor unit 1.

Strip-shaped stop edges 2 projecting from the side face plane are provided as connecting contacts on each of the side faces of the varistor unit 1.

External clip or plug contacts 4 are inserted into a housing bottom 3, which means that the overvoltage protection device shown is embodied as a plug-type component which can be plugged into a non-illustrated base part.

Figure 1:
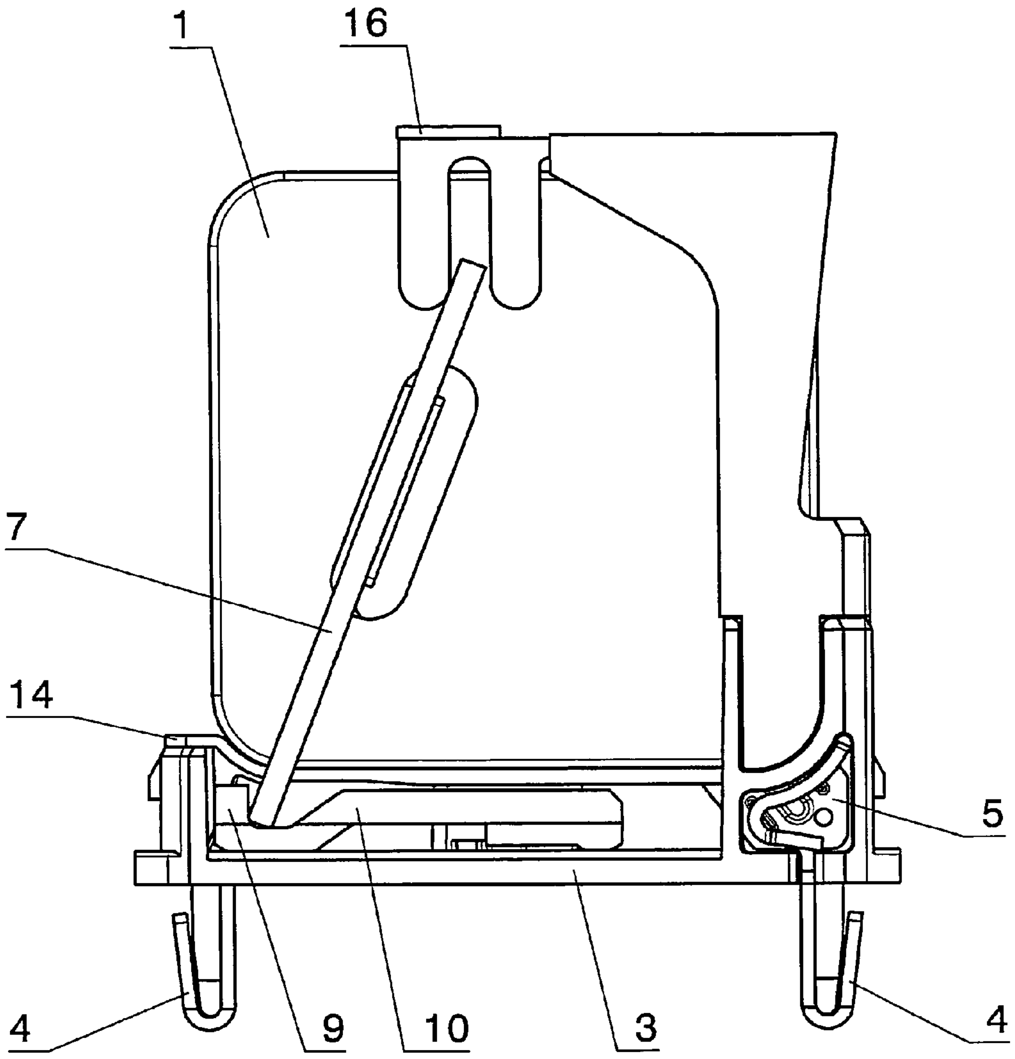
FIG. 1 shows a lateral view of the overvoltage protection device (without housing cap)

The plug contact 4 shown on the right-hand side of FIG. 1 is in contact with, specifically soldered to a joint connection terminal 5 of the varistor unit 1.

The actual switching device is in the form of a U-shaped solid switching fork 6 which includes two fork tines 7 spaced apart from each other.

The fork tines 7 are connected by a section 8. This section 8 also represents the contacting surface to the clip contact or plug contact 4 (shown on the left-hand side of FIG. 1).

Figure 2:
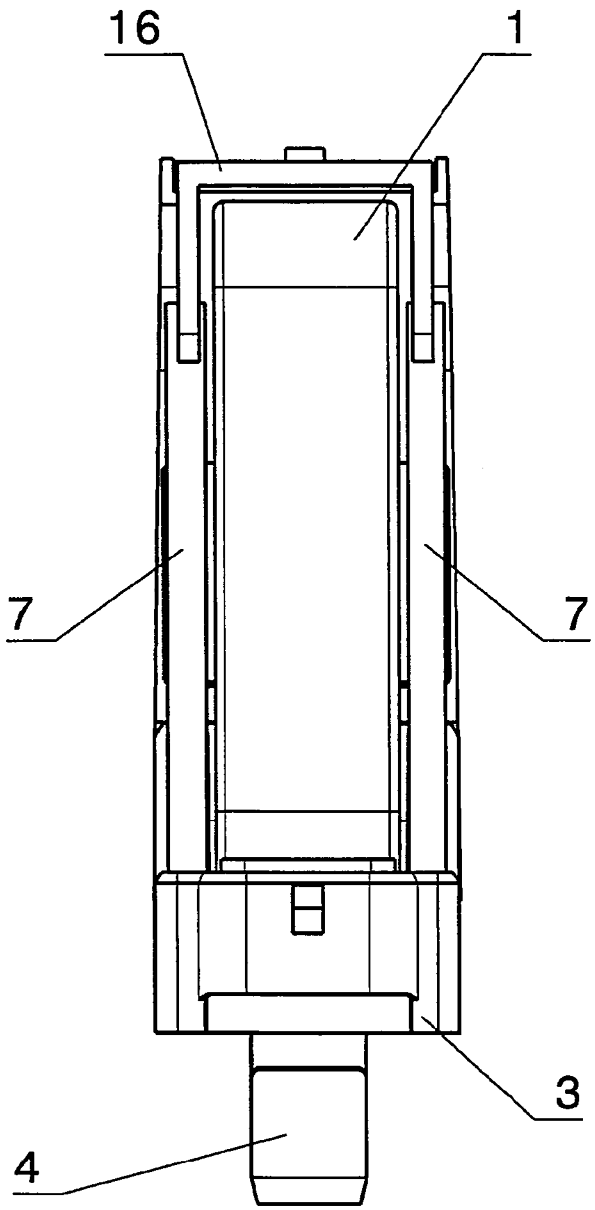
FIG. 2 shows a front view of the overvoltage protection device as shown in FIG. 1, likewise without housing cap.
Figure 3:
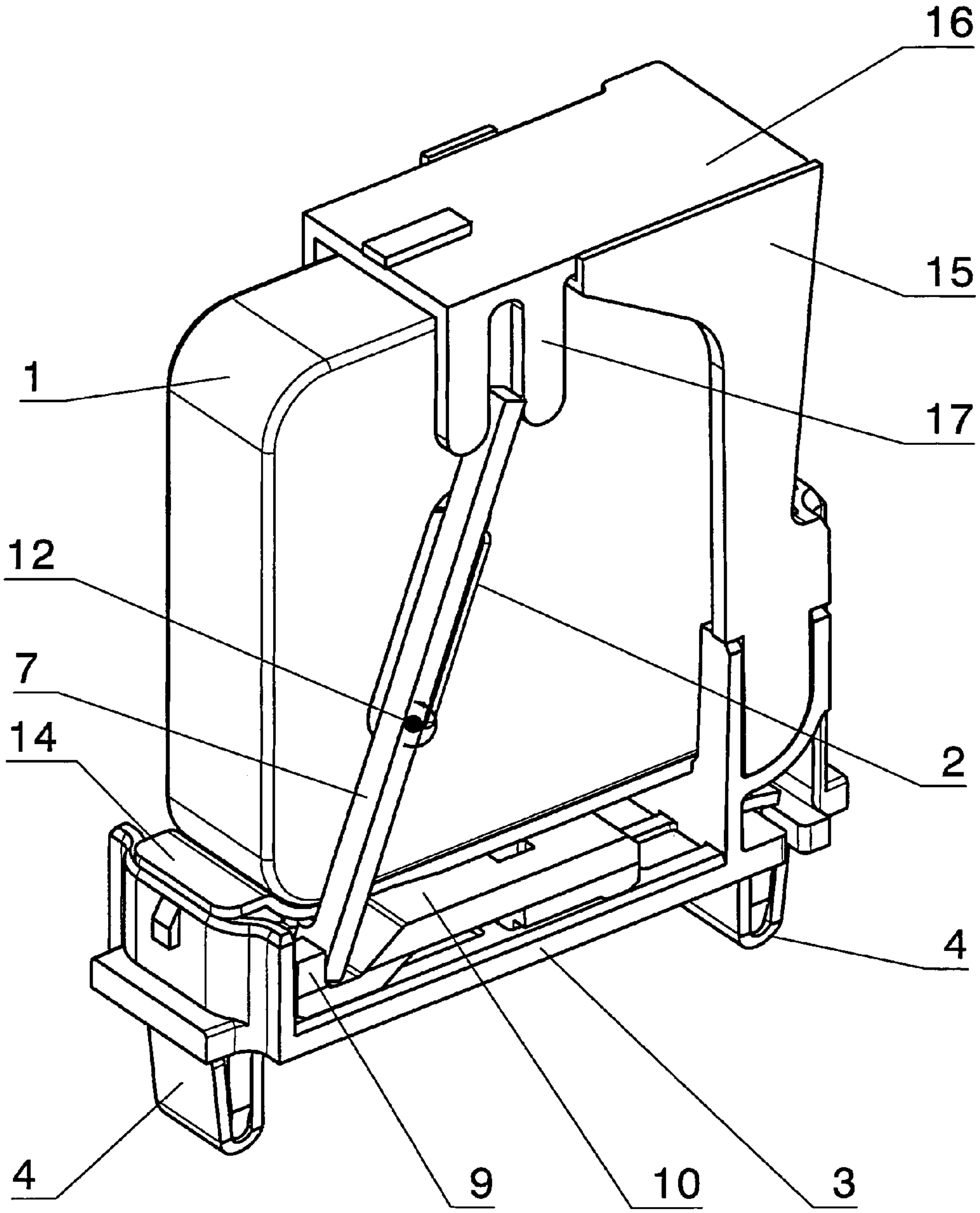
FIG. 3 shows a perspective view of the overvoltage protection device with a suggested fulcrum of the disconnecting device comprising a solid switching fork.

It can be seen in FIGS. 2 and 3 that the fork tines 7 extend substantially parallel to the side faces of the varistor unit 1 and that the varistor unit is received in the space between the tines.

Section 8 interconnecting the fork tines is encompassed at its lateral ends by two claw-type sections 9, said claw-type sections forming part of a separating slide 10.

The separating slide 10 is mounted movably displaceably on the housing bottom 3 and is made, for instance, of a plastic injection molded part.

Also, the separating slide 10 is subjected to a preload which is generated by a compression spring 11. The force vector in this regard is oriented to face away from the point of connection between the switching fork 6 and the clip or plug contact 4 shown on the left-hand side of FIG. 1.

The fork tines 7 lie against the stop edges 2, where they are fixed by means of a solder.

In the event of a disconnection the separating slide 10 moves by carrying along the switching fork 6. At the same time, the point of connection between the fork tine 7 and the connecting contact 2 represents a fulcrum 12 with respect to the movement of the switching fork.

The graphic presentation, which is not true to scale, shows that the switching fork 6 is made of a solid metallic component and, thus, has a sufficient surge current carrying capacity.

Figure 4:
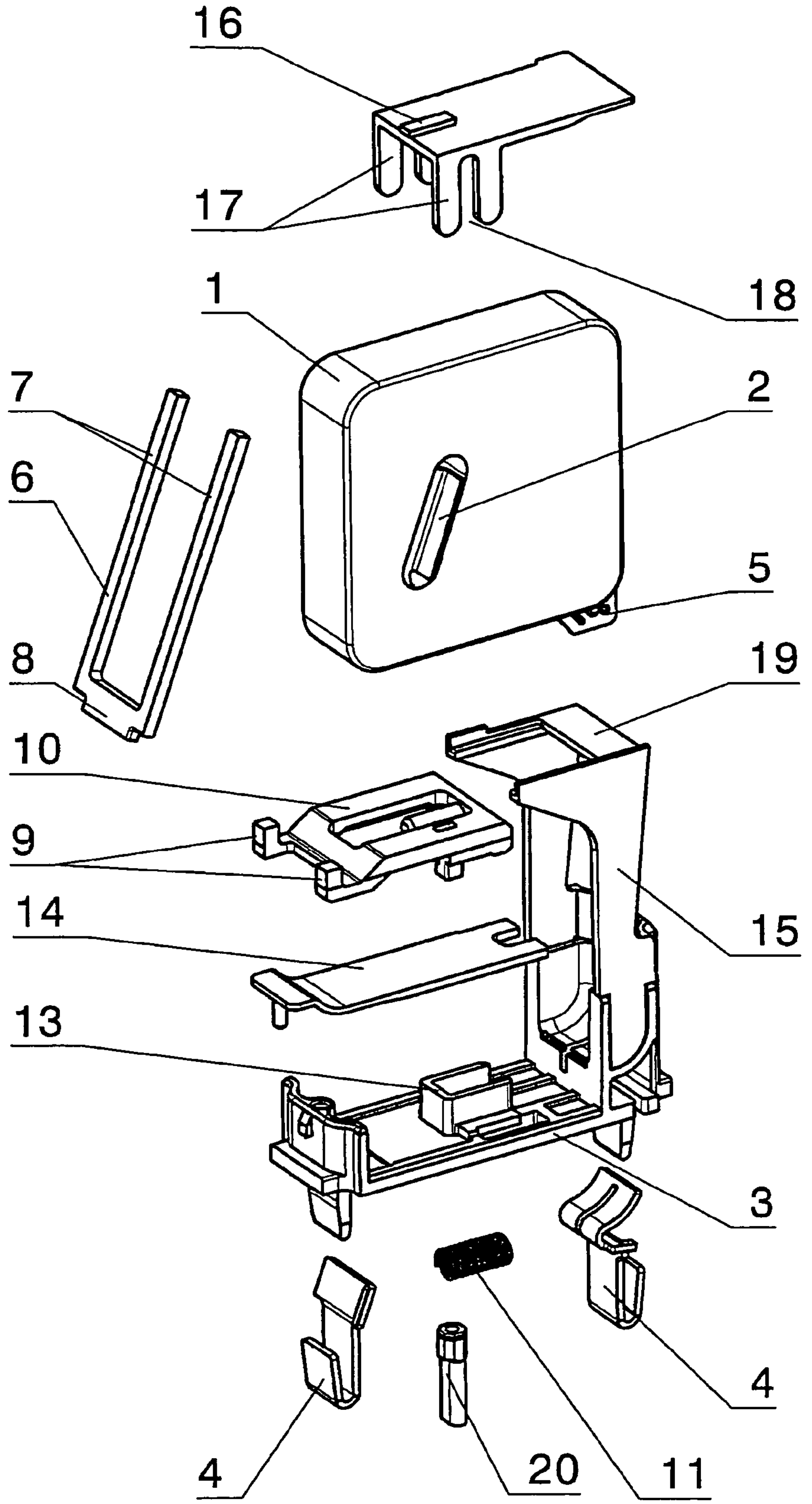
FIG. 4 shows an exploded view of essential elements of the overvoltage protection device (again, without housing cap or outer housing).

FIG. 4 shows the guide 13 for the separating slide 10 which includes a groove-shaped recess adapted to the dimensions of the guide 13.

The guide 13 forms part of the housing bottom 3. An insulating cover 14 is provided between the separating slide 10 and the varistor unit 1.

As can be seen, the claw-type sections 9 of the separating slide 10 extend from the housing bottom 3 in an upward direction.

The varistor unit 1, on the other hand, extends perpendicular to the bottom 3, wherein the varistor unit 1 is partially encompassed by a fixing leg 15 over a longitudinal outer edge.

The fixing leg 15 serves to receive a movable optical display panel 16.

The movable display panel 16 comprises two lateral prolongations 17 extending in a downward direction and enclosing a groove 18. A respective end of the fork tine 7 of the switching fork 6 engages with the groove 18 so as to change the position of the display panel 16 during the disconnection process by displacing it and pulling it along. At the same time, an upper section of the fixing leg 15 is exposed, which serves as a so-called red display 19 (fault indication).

Preferably, the optical display panel 16 is made of a green colored plastic material, thereby symbolizing the "green display", i.e. the proper condition. The change of the color position green/red is visible through a non-illustrated window of a non-illustrated outer housing.

Additionally, a coding pin 20 known per se can be inserted into the housing bottom 3 so as to prevent a wrong insertion of a (non-illustrated) base part.

Thus, the disconnecting device as introduced is substantially comprised of a U-shaped switching fork which produces the electrical contact between the connecting lugs of the varistors and the external plug contact.

The connection of the connecting lugs of the varistors to the switching fork and of the switching fork to the plug contact form, together with a low melting solder, the points of separation. The separating slide, which is located in the space between the housing bottom and the varistor unit, grabs the outer ends of the switching fork by means of the claws. After the soldering joints have melted the disconnection is accomplished by a spring force preload, whose force vector acts between the separating slide and the housing bottom. By triggering the separating slide a recess on the lower side of the plug-type part is exposed, which results in lifting a pressure pin (not shown) and switching a remote fault indicating device in the lower part. When the point of disconnection is opened by the separating slide the switching fork performs a rotary motion, during which the lower edges of the connecting lugs of the varistors act quasi as rotational axes. The upper fork tines 7 projecting over the connecting lugs of the varistors serve as a catch for the optical display panel 16 owing to the engagement of the respective fork tine sections with the groove 18.

LIST OF REFERENCE NUMBERS

1 varistor unit
2 stop edges/connecting contact
3 housing bottom
4 clip contact or plug contact
5 connection terminal
6 switching fork
7 fork tines
8 section
9 claw-type section
10 separating slide
11 compression spring
12 fulcrum
13 guide
14 insulating cover
15 fixing leg
16 optical display panel
17 prolongation
18 groove
19 red display
20 coding pin

The invention claimed is:

1. An overvoltage protection device having one or more parallel-connected overvoltage-limiting elements, which are located in one physical unit, such as varistors, diodes or means of this type configured in the form of a disc, comprising a switching device in order to electrically disconnect the overvoltage-limiting elements when they are thermally overloaded, and means for indicating and/or reporting the fault condition which then occurs, wherein the switching device is connected via a thermally separable means, such as an adhesive or a solder, to a connecting contact of the at least one overvoltage-limiting element and/or to an external clip contact or plug contact, and wherein the at least one connecting contact is located on one of the side faces of the overvoltage-limiting element configured in the form of a disc, characterized in that the switching device is in the form of a solid U-shaped switching fork (6), the fork tines (7) of which run essentially parallel to the side faces of the overvoltage-limiting element (1) and receive the latter in the space between the tines, furthermore the section (8) connecting the fork tines (7) is electrically connected to one of the external clip or plug contacts (4) and rests on a separating slide (10) which comprises at least one claw-type section (9) encompassing the end of the switching fork (6) located there, the separating slide (10) is subjected to a spring force preload, wherein the force vector in this regard is oriented to face away from the point of connection between the switching fork (6) and the external clip or plug contact (4), at least one of the fork tines (7) lies against the at least one connecting contact (2), where it is fixed by the thermally separable means, wherein, in the event of a disconnection, the separating slide (10) moves by carrying along the switching fork (6), with the point of connection between the fork tine (7) and the connecting contact (2) representing a fulcrum (12) with respect to the movement of the switching fork.

2. The overvoltage protection device according to claim 1, characterized in that the overvoltage-limiting elements are comprised of at least two varistor discs, which are arranged in parallel, and that a first connecting contact (2) is located on one of these side faces, wherein the additional second connecting contacts (5) are connected to the additional ones of the external clip or plug contacts (4) and the respective fork tines (7) of the switching fork (6) are each fixed to one of the first connecting contacts (2) by the thermally separable means, wherein occurring currents flow through the fork tines (7) in the parallel direction.

3. The overvoltage protection device according to claim 2, characterized in that the separating slide (10) is mounted in a guide (13) which forms part of the bottom (3) of a housing receiving the protection device.

4. The overvoltage protection device according to claim 1, characterized in that the separating slide (10) is mounted in a guide (13) which forms part of the bottom (3) of a housing receiving the protection device.

5. The overvoltage protection device according to claim 4, characterized in that the separating slide (10) is movably guided parallel to the housing bottom (3) between openings located there for receiving the clip or plug contacts (4).

6. The overvoltage protection device according to claim 5, characterized in that the claw-type sections (9) of the separating slide (10) extend from the housing bottom (3) in an upward direction.

7. The overvoltage protection device according to claim 5, characterized in that the disc-shaped overvoltage-limiting element(s) extend(s) substantially perpendicular to the housing bottom (3) in an upward direction.

8. The overvoltage protection device according to claim 5, characterized in that a fixing leg (15) for receiving a movable optical display panel (16) extends over a longitudinal outer edge of the disc-shaped overvoltage-limiting elements (1) by partially encompassing the latter.

9. The overvoltage protection device according to claim 4, characterized in that the claw-type sections (9) of the separating slide (10) extend from the housing bottom (3) in an upward direction.

10. The overvoltage protection device according to claim 9, characterized in that the disc-shaped overvoltage-limiting element(s) extend(s) substantially perpendicular to the housing bottom (3) in an upward direction.

11. The overvoltage protection device according to claim 9, characterized in that a fixing leg (15) for receiving a movable optical display panel (16) extends over a longitudinal outer edge of the disc-shaped overvoltage-limiting elements (1) by partially encompassing the latter.

12. The overvoltage protection device according to claim 4, characterized in that the disc-shaped overvoltage-limiting element(s) extend(s) substantially perpendicular to the housing bottom (3) in an upward direction.

13. The overvoltage protection device according to claim 6, characterized in that an insulating bearing part or an insulating cover (14) is provided between the separating slide (10) and the disc-shaped overvoltage-limiting elements (1).

14. The overvoltage protection device according to claim 12, characterized in that a fixing leg (15) for receiving a movable optical display panel (16) extends over a longitudinal outer edge of the disc-shaped overvoltage-limiting elements (1) by partially encompassing the latter.

15. The overvoltage protection device according to claim 4, characterized in that a fixing leg (15) for receiving a movable optical display panel (16) extends over a longitudinal outer edge of the disc-shaped overvoltage-limiting elements (1) by partially encompassing the latter.

16. The overvoltage protection device according to claim 15, characterized in that the movable display panel (16) comprises at least one lateral prolongation (17) with a groove (18), wherein one end of the fork tine (7) of the switching fork (6) engages with the groove (18) so as to change the position of the display panel (16) during the disconnection process.

17. The overvoltage protection device according to claim 4, characterized in that an opening for receiving a pin is located in the housing bottom (3), which actuates or triggers a remote fault indicating device depending on the position of the separating slide (10).

18. The overvoltage protection device according to claim 1, characterized in that the connecting contacts (2) on the side faces of the overvoltage-limiting elements (1) are configured as strip-shaped stop edges projecting from the side face plane.

19. The overvoltage protection device according to claim 18, characterized in that the ends of the stop edges facing in the direction of the housing bottom (3) of the assembly define the fulcrum (12) for the movement of the switching fork (6) during the disconnection process.

20. The overvoltage protection device according to claim 1, characterized in that the thermally separable means connect the fork tines (7) to the connecting contacts (2) on the overvoltage-limiting elements (1) as well as the section (8) connecting the fork tines (7) to the corresponding external clip or plug contact (4).

* * * * *